United States Patent [19]
Deutsch et al.

[11] Patent Number: 5,203,152
[45] Date of Patent: Apr. 20, 1993

[54] DEFLECTOR FOR A COTTON HARVESTER ROW UNIT

[75] Inventors: Timothy A. Deutsch, Newton; Russell D. Copley, Ankeny, both of Iowa

[73] Assignee: Deere & Company, Moline, Ill.

[21] Appl. No.: 811,498

[22] Filed: Dec. 20, 1991

[51] Int. Cl.$^5$ ............................................. A01D 46/16
[52] U.S. Cl. ............................................. 56/36; 56/28
[58] Field of Search ....... 56/28, 36, DIG. 5, DIG. 20

[56] References Cited

U.S. PATENT DOCUMENTS

| | | | |
|---|---|---|---|
| 2,025,514 | 12/1935 | Johnston | 56/36 |
| 2,665,534 | 1/1954 | Rust | 56/36 |
| 2,776,534 | 1/1957 | Sanders | 56/36 |
| 2,999,349 | 9/1961 | Nichols, Jr. | 56/28 |
| 3,143,840 | 8/1964 | Weatherall | 56/28 |
| 3,218,788 | 11/1965 | Hubbard | 56/28 |
| 3,458,980 | 8/1969 | Lee | 56/28 |
| 3,533,224 | 10/1970 | Keck | 56/28 |
| 4,125,988 | 11/1978 | Schlueter | 56/36 X |

Primary Examiner—George A. Suchfield

[57] ABSTRACT

A deflector for directing the upper portion of tall cotton plants downwardly below the top of the cotton opening on a row unit of a cotton picker. A single sheet of metal includes a connecting portion having an upright slotted section which is bolted to unit at the top of the opening. An inclined portion extends downwardly and forwardly from the connecting portion to a rounded portion for gently urging the plant below the level of the uppermost row of spindles on the picker drum to prevent drum overloads. The inclined portion in combination with a relatively large radius of curvature of the crop contacting portion minimizes cotton loss and trash build-up.

16 Claims, 2 Drawing Sheets

DEFLECTOR FOR A COTTON HARVESTER ROW UNIT

BACKGROUND OF THE INVENTION

1. Field of the Invention

The present invention relates generally to cotton harvesters and more specifically to structure for preventing cotton harvester row units from plugging when operating in relatively high yield cotton.

2. Related Art

Cotton harvesters such as the John Deere 9960 Cotton Picker include row units, each with a unit housing having a forward row-receiving area opening into a plant passage. Upright picker drums on one side of the passage pick the cotton from the plants. In tall, high yield cotton, the plants often are higher than the upper extremity of the row-receiving area so that the plants must move downwardly into the passage. As a result, bolls often break off and are lost. In addition, the concentration of cotton at the uppermost part of the plant passage overloads the top of the drums and causes frequent operation of the row unit slip clutch which results in premature wear and reduced productivity of the harvester.

Attempts to alleviate the problems of heavy cotton concentration at the upper part of the row unit have included placing a rod across the upper part of the row receiving area or supporting a deflector wheel forwardly of the unit housing to force the upper parts of the cotton plants downwardly. However, green bolls often break off when the plant encounters the rod, and rod installation often requires adding holes to the existing unit. In addition, trash can accumulate around the rod area. The wheel is relatively cumbersome and expensive.

BRIEF SUMMARY OF THE INVENTION

It is therefore an object of the present invention to provide an improved device for a cotton harvester row unit which reduces many of the problems of harvesting high yield cotton. It is another object to provide such a device which is relatively simple and inexpensive in construction.

It is a further object to provide an improved device for a cotton harvester row unit for deflecting tall cotton plants downwardly prior to entering the row-receiving area in the unit housing. It is another object to provide such a device which is shaped to reduce boll loss and plugging, even in tall high yield cotton. It is still another object to provide such a device which is relatively simple and inexpensive in construction, is adjustable, and which can be retrofitted easily onto existing row units without extensive modification.

A specially shaped deflector is provided for directing the upper portion of tall cotton plants downwardly below the top of the cotton opening on a row unit of a cotton picker. The deflector, which may be fabricated from a single sheet of metal, includes a connecting portion having an upright slotted section which is bolted to the row unit near the top of the opening using existing housing hardware. An inclined face extends downwardly and forwardly from the connecting portion to a rounded forward portion for urging the plant below the level of the uppermost portion of the picker drum to prevent excessive cotton at the top of the drum which would lead to drum overloading. The inclined portion which prevents green bolls from snapping back as the plant is contacted, in combination with a relatively large radius of curvature of the crop contacting portion which minimizes plant bending, significantly reduce cotton boll loss while easily shedding trash. The deflector is relatively simple and inexpensive in construction and can be adjustably mounted on existing row units without significant modification of the units.

These and other objects, features and advantages of the present invention will become apparent to one skilled in the art upon reading the following detailed description in view of the drawings.

DETAILED DESCRIPTION OF THE DRAWINGS

Figure 1:
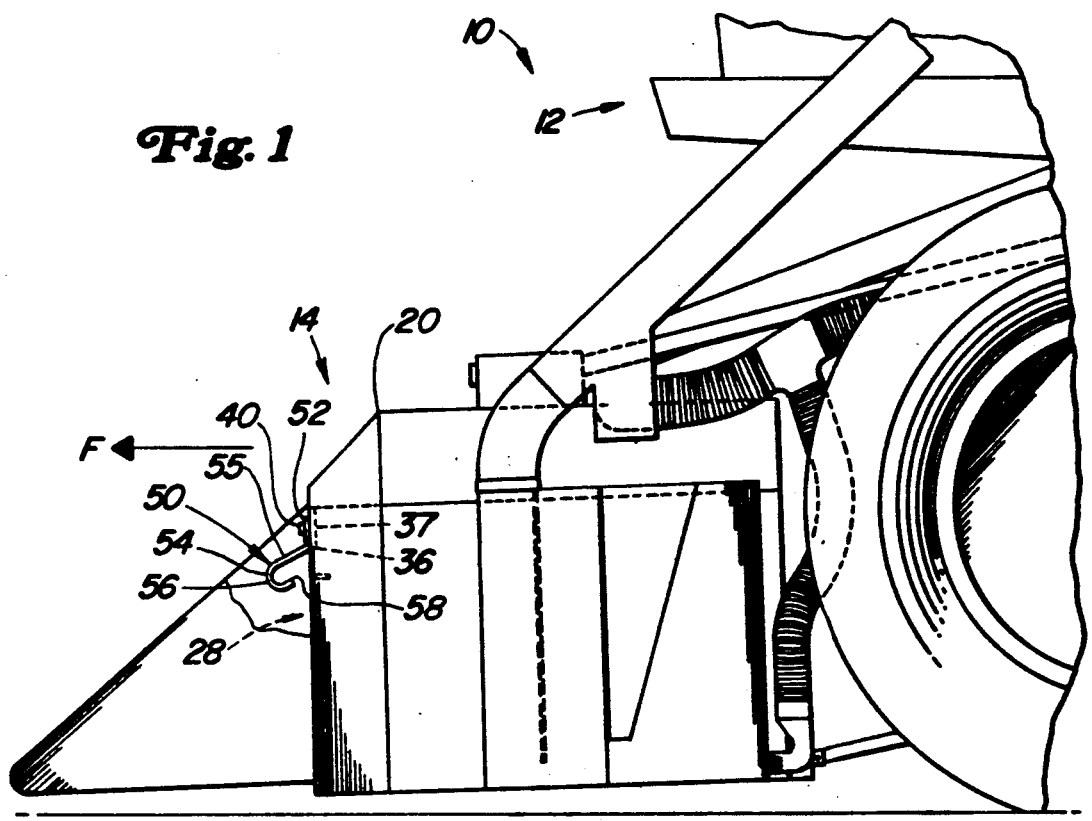
FIG. 1 is a side view of the front portion of a cotton harvester with the portions of a row unit broken away to more clearly show the deflector of the present invention.
Figure 2:
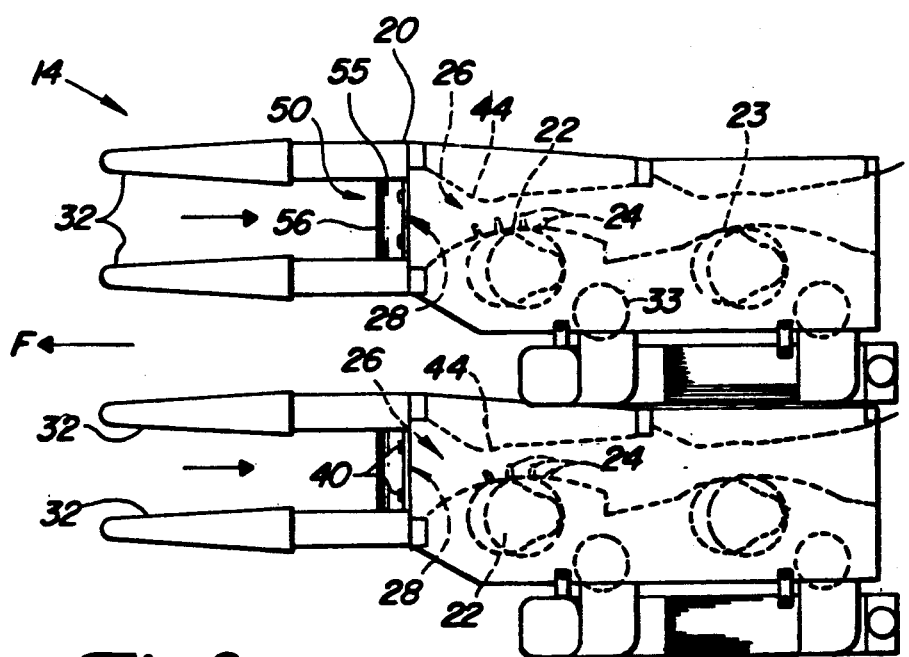
FIG. 2 is a top view of two of the row units on the harvester of FIG. 1.

Referring now to FIG. 1, therein is shown a forward portion of a cotton harvester 10 with a frame 12 having a plurality of row units 14 supported for forward movement (F) though a field of cotton. The row units 14 are generally conventional in construction and may be of the type utilized on the commercially available John Deere 9960 Cotton Picker. A row unit housing 20 supports a pair of upright picker drums 22, 23 with vertically spaced rows of spindles 24 and defines a fore-and-aft extending plant passage 26 having a forward opening 28. Plant guides 32 direct the cotton plants toward the opening 28. The spindles 24, which are rotated in the row of cotton plants entering the plant passage 26, remove the cotton from the plants, and doffers 33 remove the cotton from the spindle and direct it towards conventional cotton conveying structure.

The opening 28 includes an uppermost boundary or edge 36 defined by the lower edge of a forward panel 37 secured in part to the remainder of the housing 20 by a pair of transversely spaced bolts 40. The boundary or lower panel edge 36 lies ahead of the forward drum 22 and is approximately the same height as the uppermost row of spindles 24 on the drum. Upright sidewalls 38 and 39 extend downwardly from the top wall portion 36 to define the transverse boundaries of the opening 28.

As the harvester 10 is driven forwardly through the field of cotton, the plants are directed towards the opening 28 by the guides 32. As the plants enter the passage 26, they are urged toward the drum 22 by pressure plates 44 so that the cotton bolls can be contacted by the rotating spindles 24. One can easily appreciate the fact that as tall, high yield cotton is encountered which extends above the edge 36, some of the cotton plant must be bent downwardly as the plant enters the passage 26. As a result, a very heavy concentration of cotton is often encountered by the uppermost rows of spindles 24 on the drums since those spindles have to remove the cotton which is at and above spindle level.

Figure 3:
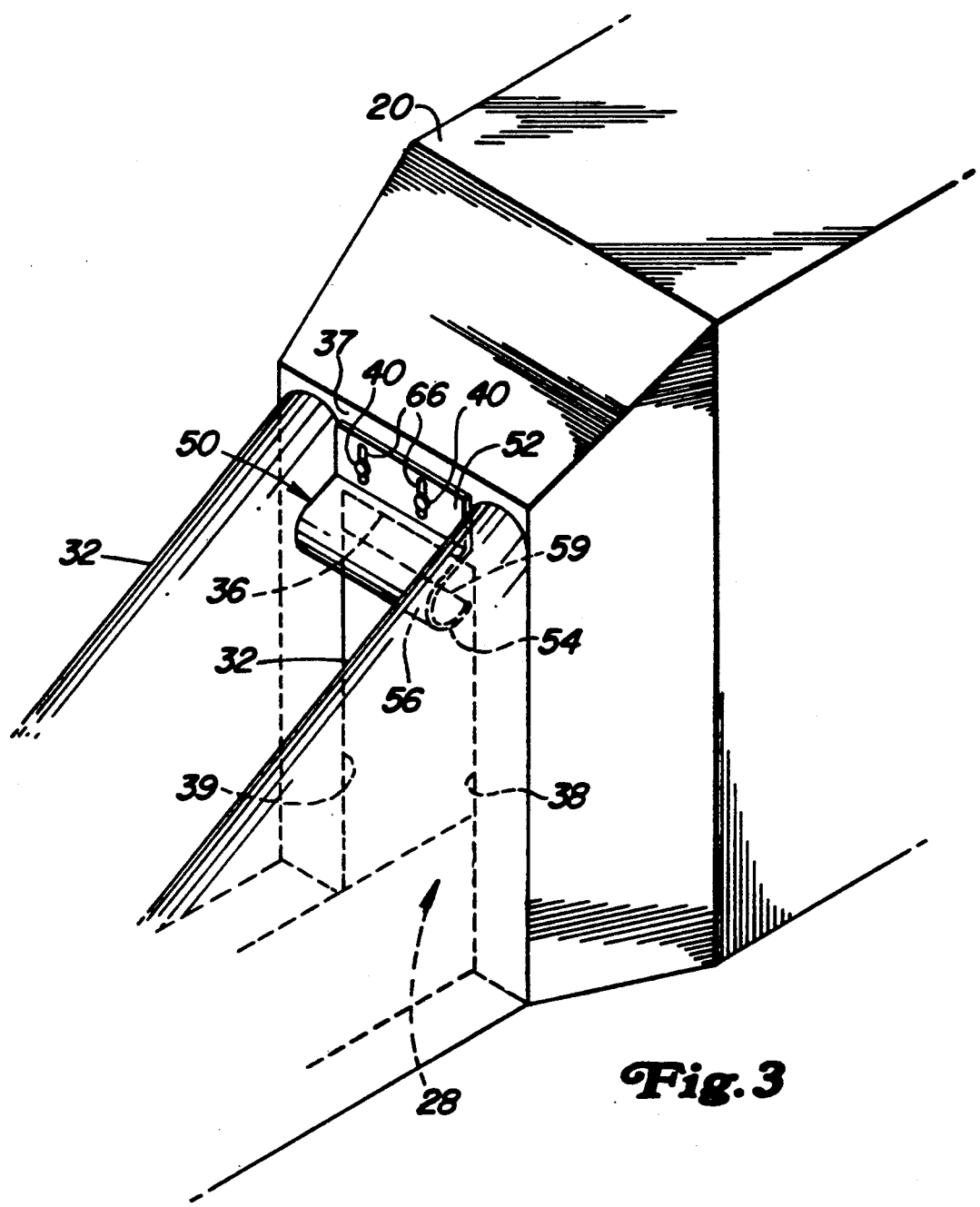
FIG. 3 is front perspective view of one of the row units of FIG. 2.

To better distribute the cotton at the upper portion of the drums and prevent the plants from overloading the drums, a deflector 50 is attached to the row unit housing 20 near the upper edge 36 of the opening. The deflector 50 is fabricated from a single piece of flat sheet metal and includes a flat, upright connecting portion 52 and a crop deflecting portion 54 with an upwardly and forwardly directed face 55 and rounded front portion 56. Preferably the face is approximately slightly less than three inches in length and has a width approximately equal to the width of the opening 28. The face 55 leads into the top of the rounded front portion 56 which has a radius of curvature of at least about one inch centered on a horizontal axis extending transversely to the forward direction (F). The curve extends through an arc of slightly less than 180° from the upper face 55 to a trailing end portion 58 which is angled downwardly with respect to the plane of the face 55 by about 10°. The end portion 58 extends tangentially from the rounded portion 56 for a short distance and terminates in a rear edge 59 located below the face 55 and just ahead of the opening 28. The connecting portion 52 includes a pair of vertical slots 66 having a transverse spacing equal to that of the bolts 40 so that the deflector 50 can be easily attached to the housing panel 37 above the edge 36 using the existing hardware on the housing 20. When the deflector is attached, the face 55 of the deflecting portion 54 forms an angle of approximately 52° with the panel 37 (which lies generally in a vertical plane). The rounded front portion 56 is located substantially below and forwardly of the upper boundary 36 of the opening 28 (see FIG. 1). The amount of projection of the deflector 50 downwardly into the row of cotton is adjustable by loosening the bolts 40 and sliding the deflector up or down from the central position shown in FIG. 3.

The crop deflecting portion 54 with the inclined face 55 and relatively large radius of curvature of the crop contacting portion 56 provide a gentle deflecting action to urge the upper parts of tall cotton plants to a level several inches below the top row of spindles 24 with minimal boll loss as the plant enters the opening 28. Upon entering the opening 28, the plant has cleared the trailing portion 58 of the deflector 50 and begins to spring upwardly. By the time the plant reaches the first drum 22, the bolls are spread relatively evenly over the upper rows of spindles and can be harvested more efficiently than if concentrated at the very top of the drum. The inclined surface of the deflector 50 is relatively self-cleaning and as such does not clog easily with trash.

Having described the preferred embodiment, it will become apparent that various modifications can be made without departing from the scope of the invention as defined in the accompanying claims.

What is claimed is:

1. In a cotton harvester including a row unit with a housing defining a plant passage with a forward opening of preselected width, the forward opening having an upper boundary and adapted to receive a row of cotton plants including cotton plants which extend above the upper boundary, and an upright picker drum supported in the housing rearwardly of the opening, a deflector comprising:
   a crop contacting portion including a forward curved portion with radius of curvature equal to or greater than about one inch and width equal to at least approximately the preselected width, and
   means for supporting the crop contacting portion from the housing with the curved portion located forwardly of and below the upper boundary to deflect cotton plants downwardly below the upper boundary and thereby reduce the amount of cotton picked by the uppermost portion of the drum.

2. The invention as set forth in claim 1 wherein the contacting portion includes an inclined portion extending downwardly and forwardly from upper boundary to define a forwardly and upwardly directed surface above the forward curved portion for reducing cotton plant flexing and loss from plants which extend above the upper boundary.

3. The invention as set forth in claim 2 wherein the means for supporting the crop contacting portion includes an upright slotted portion connected to the inclined portion and being vertically adjustable relative to the housing to adjust the level of the curved portion relative to the upper boundary.

4. The invention as set forth in claim 3 wherein the inclined portion is angled downwardly and forwardly from the from the upright slotted portion at an angle of about 52° with respect to the vertical.

5. The invention as set forth in claim 4 wherein the curved portion curves downwardly from the inclined portion to a trailing end located below the inclined portion and forwardly of and below the upper boundary so that the cotton plant begins to spring upwardly as it passes rearwardly of the trailing end and through the opening.

6. The invention as set forth in claim 4 wherein the deflector is fabricated from a single piece of sheet metal.

7. The invention as set forth in claim 3 wherein the means for supporting comprises bolt means extending through the upright portion and into the housing for securing the connecting portion in one of a plurality of vertically adjusted positions.

8. The invention as set forth in claim 1 wherein the deflector is fabricated from a single piece of sheet metal.

9. In a cotton harvester including a row unit with a housing defining a plant passage with a forward opening of preselected width, the forward opening having an upper boundary and adapted to receive a row of cotton plants including cotton plants which extend above the upper boundary, and an upright picker drum supported in the housing rearwardly of the opening, a deflector comprising:
   a crop contacting portion including a forward curved portion and an inclined portion connected to the curved portion;
   means for supporting the crop contacting portion from the housing with the curved portion located forwardly of and below the upper boundary and with the inclined portion sloping downwardly and forwardly from the upper boundary toward the curved portion to deflect cotton plants downwardly below the upper boundary and thereby reduce the amount of cotton picked by the uppermost portion of the drum.

10. The invention as set forth in claim 9 wherein the the inclined portion is flat and defines a forwardly and upwardly directed surface above the forward curved portion for reducing cotton plant flexing and loss from plants which extend above the upper boundary.

11. The invention as set forth in claim 10 wherein the deflector is fabricated from a single piece of sheet metal.

12. The invention as set forth in claim 10 wherein the means for supporting the crop contacting portion includes an upright portion connected to the inclined portion and being vertically adjustable relative to the housing to adjust the level of the curved portion relative to the upper boundary.

13. The invention as set forth in claim 12 wherein the inclined portion is angled downwardly and forwardly from the from the upright portion at an angle of about 52° with respect to the vertical.

14. The invention as set forth in claim 13 wherein the curved portion curves downwardly from the inclined portion with a radius of curvature of at least approximately one inch to a trailing end located below the inclined portion and forwardly of and below the upper boundary so that the cotton plants begin to spring upwardly as they pass rearwardly of the trailing end and through the opening.

15. The invention as set forth in claim 13 wherein the deflector is fabricated from a single piece of sheet metal.

16. The invention as set forth in claim 12 wherein the means for supporting comprises bolt means extending through the upright portion and into the housing for securing the upright portion, the upright portion being vertically slotted to receive the bolt means so that the upright portion is securable in one of a plurality of vertically adjusted positions.

* * * * *